United States Patent
Zeung et al.

(10) Patent No.: US 12,193,083 B2
(45) Date of Patent: Jan. 7, 2025

(54) WIRELESS DEVICE AND OPERATING METHOD OF WIRELESS COMMUNICATION SYSTEM

(71) Applicants: PIXART IMAGING INC., Hsin-Chu County (TW); AIROHA TECHNOLOGY CORP., Hsinchu (TW)

(72) Inventors: Ping-Shun Zeung, Hsin-Chu County (TW); Chih-Wei Sung, Hsinchu County (TW); Yu-Feng Chen, Hsinchu County (TW)

(73) Assignees: PIXART IMAGING INC., Hsin-Chu County (TW); AIROHA TECHNOLOGY CORP., Hsinchu (TW)

( * ) Notice: Subject to any disclaimer, the term of this patent is extended or adjusted under 35 U.S.C. 154(b) by 450 days.

(21) Appl. No.: 17/673,005

(22) Filed: Feb. 16, 2022

(65) Prior Publication Data
US 2023/0262792 A1    Aug. 17, 2023

(51) Int. Cl.
| | |
|---|---|
| H04W 76/14 | (2018.01) |
| H04R 1/10 | (2006.01) |
| H04W 76/25 | (2018.01) |
| H04W 76/30 | (2018.01) |
| H04W 4/80 | (2018.01) |
| H04W 84/12 | (2009.01) |

(52) U.S. Cl.
CPC .......... *H04W 76/14* (2018.02); *H04R 1/1016* (2013.01); *H04R 1/1025* (2013.01); *H04R 1/1041* (2013.01); *H04W 76/25* (2018.02); *H04W 76/30* (2018.02); *H04R 2420/07* (2013.01); *H04W 4/80* (2018.02); *H04W 84/12* (2013.01)

(58) Field of Classification Search
CPC ..... H04W 76/25; H04W 76/30; H04R 1/1041
USPC ........................................ 370/329, 400, 395
See application file for complete search history.

(56) References Cited

U.S. PATENT DOCUMENTS

| | | | |
|---|---|---|---|
| 9,769,558 B2 * | 9/2017 | Chandramohan | A45C 13/1069 |
| 11,589,150 B2 * | 2/2023 | Panecki | H04R 1/1016 |

* cited by examiner

*Primary Examiner* — Dang T Ton
(74) *Attorney, Agent, or Firm* — HAUPTMAN HAM, LLP

(57) ABSTRACT

There is provided a wireless device including an earphone set and a charging cradle. The charging cradle is used as means for charging the earphone set. The charging cradle further records connection information of multiple external devices that have been BT connected to the charging cradle. The earphone set receives a connection command from the charging cradle to accordingly form an audio connection to one of the multiple external devices. The charging cradle is further used as a communication medium between the multiple external devices.

8 Claims, 7 Drawing Sheets

WIRELESS DEVICE AND OPERATING METHOD OF WIRELESS COMMUNICATION SYSTEM

BACKGROUND

1. Field of the Disclosure

This disclosure generally relates to a wireless communication system and, more particularly, to a wireless device that is used as a communication medium and capable of switching an audio connection between different platforms, and an operating method of a wireless communication system including the same.

2. Description of the Related Art

Presently, some Bluetooth (BT) earphones are arranged to be able to connect to multiple electronic devices at the same time such that these BT earphones are able to receive audio data from different electronic devices at the same time to cause interference between sounds from different sources.

Furthermore, in the configuration that a BT earphone is allowed to be BT connected to a single device, when a user tries to connect the BT earphone to another device, an audio connection between the BT earphone and the single device needs to be released at first and then the user can manually build an audio connection between the BT earphone with the another device such that the whole connection switching is accomplished. It is complicated to perform the connection switching such that the user experience is poor.

Accordingly, the present disclosure provides a wireless device that automatically accomplishes the audio connection switching between the BT earphone and different paired devices with the help of a charging cradle, and an operating method of a wireless communication system that uses a wireless earphone module as a communication medium between different platforms.

SUMMARY

The present disclosure provides a wireless device including a charging cradle and an earphone set. The wireless device switches an audio connection between the earphone set and external devices using the charging cradle so as to eliminate sound interference and improve the user experience.

The present disclosure further provides a wireless communication system and an operating method thereof that use a earphone charging cradle as a communication medium between different platforms and to automatically switch platforms in different WiFi networks.

The present disclosure further provides a wireless communication system and an operating method thereof that keep a Bluetooth connection and a WiFi connection alive under background environment of external devices.

The present disclosure provides a wireless device including a charging cradle and an earphone. The charging cradle is configured to record connection information of multiple external devices which respectively form a Bluetooth (BT) connection with the charging cradle, and to transmit a connection request command. The earphone is configured to be accommodated in the charging cradle for charging, and determine an audio play target according to the connection request command from the charging cradle so as to form an audio connection with one of the multiple external devices.

The present disclosure further provides an operating method of a wireless communication system. The wireless communication system includes a first device, a second device and an earphone charging cradle. The operating method includes the steps of: forming, by the earphone charging cradle, a BT connection respectively with the first device and the second device; and providing, by the earphone charging cradle, WiFi network information coupled by the first device and a first IP address of the first device to the second device via the BT connection, or providing, by the earphone charging cradle, WiFi network information coupled by the second device and a second IP address of the second device to the first device via the BT connection to cause the first device and the second device to form a WiFi connection.

The present disclosure further provides an operating method of a wireless communication system. The wireless communication system includes an earphone, a charging cradle, a first device and a second device. The operating method includes the steps of: forming, by the charging cradle, a first BT connection with the first device; informing, by the charging cradle, the earphone with an audio play target to cause the first device to form a first audio connection with the earphone; and when the charging cradle forms a second BT connection with the second device, providing, by the charging cradle, WiFi network information coupled by the first device and a first IP address of the first device to the second device via the first BT connection and the second BT connection, or providing, by the charging cradle, WiFi network information coupled by the second device and a second IP address of the second device to the first device via the first BT connection and the second BT connection to cause the first device and the second device to form a WiFi connection.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a wireless device which uses a charging cradle thereof as a switching and communicating medium, as well as a wireless communication system including the same and an operating method of the wireless communication system. In the present disclosure, the wireless device includes an earphone set (e.g., TWS earphone, but not limited to) and a charging cradle. In the present disclosure, external devices, which are previously Bluetooth (BT) paired and BT connected to the wireless device, include cellphones (including smart phones), personal computers, tablet computers, notebook computers, vehicle computers and portable audio devices, which include music players, virtual reality (VR) equipment, augmented reality (AR) equipment, sound recorders or the like.

In the present disclosure, an external device means the electronic device outside the wireless device of the present disclosure.

Figure 1:
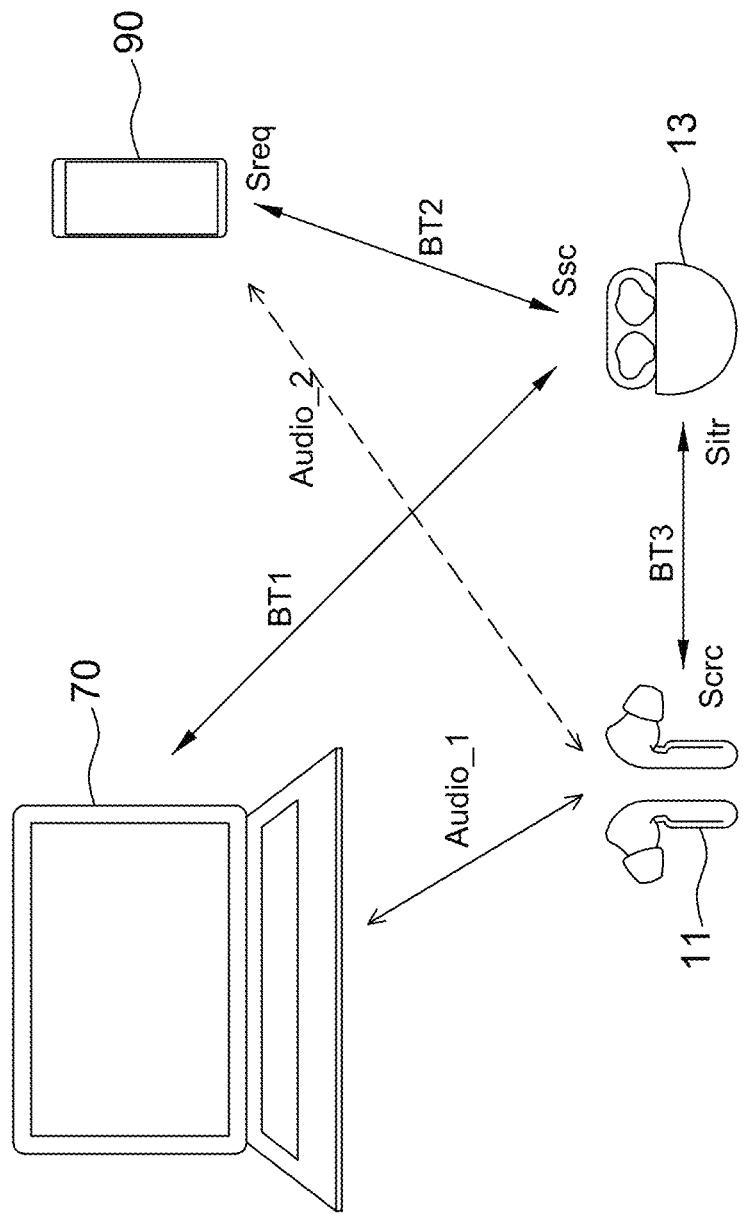
FIG. 1 is an operational schematic diagram of a wireless communication system according to a first embodiment of the present disclosure.

Please refer to FIG. 1, it is an operational schematic diagram of a wireless communication system according to a first embodiment of the present disclosure. The wireless communication system includes a wireless device and multiple external devices, wherein the wireless device includes an earphone set (sometimes abbreviated as earphone herein) 11 and a charging cradle 13, and the external devices are shown to include a first device 70 and a second device 90. In FIG. 1, the first device 70 is shown as a personal computer (PC) and the second device 90 is shown as a cellphone as an example for illustration. In other aspects, the first device 70 and the second device 90 are replaced by other electronic devices capable of forming a BT connection with the wireless device.

The earphone 11 is accommodated in the charging cradle 13 for charging, and how the charging cradle 13 accommodating the earphone 11 is not particular limited. The earphone 11 forms a BT connection with the charging cradle 13, e.g., shown as BT3. Accordingly, the charging cradle 13 knows the status of a current audio connection of the earphone 11 with an external device and exchanges signals with the earphone 11 via the BT connection BT3, e.g., transmitting a connection request command as mentioned below.

In addition, the charging cradle 13 of the present disclosure further records connection information (e.g., device address BD_ADDR, but not limited to) of multiple external devices that are currently BT connected with the charging cradle 13 (e.g., shown as first device 70 and second device 90 herein, but not limited to). Furthermore, the charging cradle 13 transmits a connection request command Scrc to the earphone 11 via the BT connection BT3 to inform the earphone 11 regarding an audio play target so as to build an audio connection with one of the multiple external devices, i.e. the audio play target.

In the present disclosure, the connection request command Scrc is sent to both of a left earphone and a right earphone of the earphone set (i.e. 11), or sent to one of the left and right earphones and said one earphone forwards the received connection request command Scrc to the other one of the left and right earphones based on a master-slave relationship therebetween. In the present disclosure, the BT connection between the earphone 11 and the charging cradle 13 means that both the left and right earphones are BT connected to the charging cradle 13; and the audio connection between the earphone 11 and one external device means that both the left and right earphones are audio connected to said one external device.

In the present disclosure, the BT connection includes specific versions and extended versions of the BT standard without particular limitations, e.g., the BT connection herein being selected from a Bluetooth low energy (BLE) connection or an LE Audio connection, but not limited to. The pairing and connecting of the BT connection and the audio connection are known to the art, and thus details are not described herein.

Figure 2:
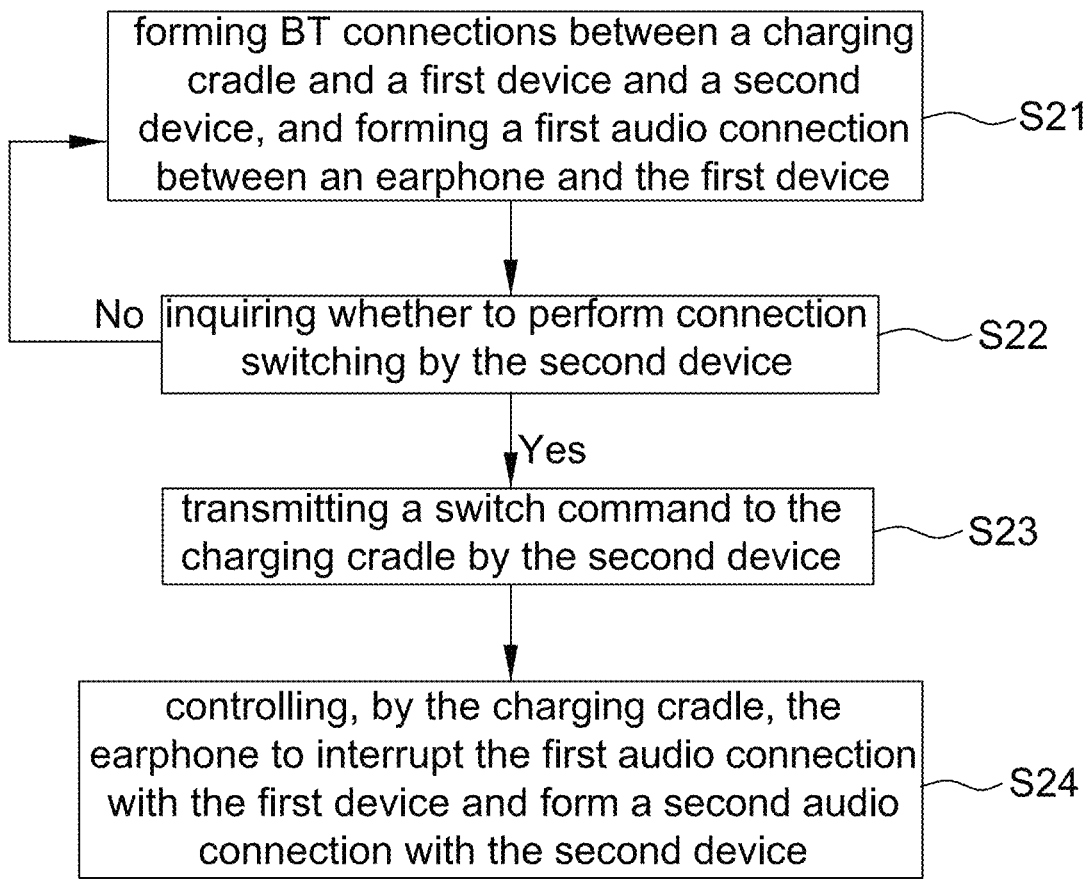
FIG. 2 is a flow chart of an operating method of a wireless communication system according to a first embodiment of the present disclosure.

FIG. 2 is a flow chart of an operating method of a wireless communication system according to a first embodiment of the present disclosure, including the steps of: forming BT connections between a charging cradle and a first device and a second device, and forming a first audio connection between an earphone and the first device (Step S21); inquiring whether to perform connection switching by the second device (Step S22); transmitting a switch command to the charging cradle by the second device (Step S23); and controlling, by the charging cradle, the earphone to interrupt the first audio connection with the first device and form a second audio connection with the second device (Step S24).

The embodiment of FIG. 2 is applied to a scenario that an audio connection target of the earphone 11 is going to be switched while the first device 70 and the second device 90 respectively have a BT connection with the charging cradle 13.

Step S21: The charging cradle 13 is coupled to the first device 70 via a first BT connection BT1, the charging cradle 13 is coupled to the second device 90 via a second BT connection BT2, and thus the charging cradle 13 records connection information of the first device 70 and the second device 90 therein. The charging cradle 13 is further coupled to the earphone 11 via a third BT connection BT3. Meanwhile, the earphone 11 forms an audio connection Audio_1 with the first device 70 so as to receive audio data from the first device 70.

Step S22: When a user starts to operate the second device 90, e.g., unlocking cellphone, the second device 90 inquires the user whether to switch the audio connection using, images, voices and/or vibrations, e.g., showing an inquiry message on a screen. If the user selects not to shift a current connection, the earphone 11 continuously audio connects to the first device 70.

Step S23: If the user selects to shift the current connection, e.g., clicking on a window or characters of agreement on the screen, the second device 90 transmits a switch command Ssc to the charging cradle 13 via the second BT connection BT2. In another aspect, the second device 90 is set to automatically transmit the switch command Ssc, without inquiry, to the charging cradle 13 when the second device 90 starts to run a multimedia program or calling function.

Step S24: After receiving the switch command Ssc, the charging cradle 13 controls, via the third BT connection BT3, the earphone 11 to break the first audio connection Audio_1 with the first device 70 and then to form a second audio connection Audio_2 with the second device 90 so as to receive audio data from the second device 90. For example, after receiving a control signal, e.g., Scrc, from the charging cradle 13, the earphone 11 reconnects (i.e. the earphone 11 already recorded with BT address of the second device 90 therein) with the second device 90 indicated by the charging cradle 13, so as to build the second audio connection Audio_2 with the second device 90. For example, the charging cradle 13 transmits the BT address or identification number (ID) associated with the second device 90 as the control signal.

In this way, the user only needs to agree (directly or indirectly) shifting audio connection on a desired external device, and the earphone 11 automatically accomplishes the connection switching via the charging cradle 13.

On the other hand, when the audio connection of the earphone 11 is going to be switched from the second device 90 to the first device 70, the first device 70 transmits a switch command (e.g., login the first device 70) to the charging cradle 13. Then, the charging cradle 13 controls, e.g., by Scrc, the earphone 11 to break the audio connection with the second device 90 and then to form an audio connection with the first device 70, and details thereof are similar to the descriptions of FIG. 2 and thus are not repeated again.

In another aspect, the connection switching is triggered when the charging cradle 13 connects with an additional new external device, which has also been previously BT paired. That is, when the new external device is BT connected with the charging cradle 13, the new external device actively inquires a user whether to switch the audio connection thereto, similar to Step S22. If the user agrees to switch the audio connection, the new external device transmits a switch command to the charging cradle 13, similar to Step S23, and then the charging cradle 13 controls the earphone 11 to interrupt the first audio connection with the first device and form a new audio connection with the new external device, similar to Step S24.

Figure 3:
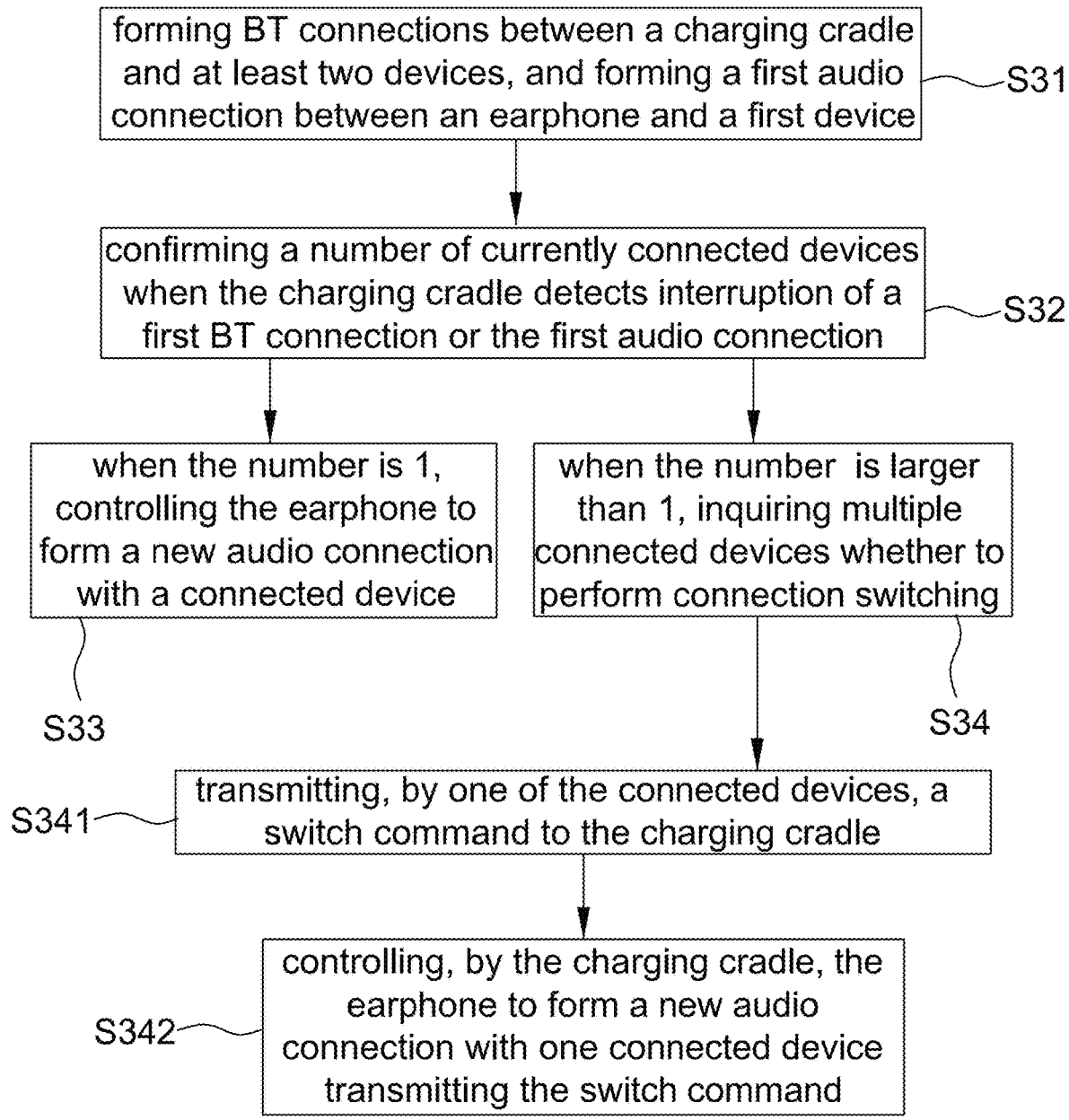
FIG. 3 is another flow chart of an operating method of a wireless communication system according to a first embodiment of the present disclosure.

Please refer to FIG. 3, it is another flow chart of an operating method of a wireless communication system according to a first embodiment of the present disclosure, including the steps of: forming BT connections between a charging cradle and a first device and a second device, and forming a first audio connection between an earphone and the first device (Step S31); confirming a number of currently connected devices when the charging cradle detects interruption of a first BT connection with the first device or the first audio connection (Step S32); when the number of currently connected devices is 1, controlling, by the charging cradle, the earphone to form a new audio connection with a connected device (Step S33); when the number of currently connected devices is larger than 1, inquiring, by the charging cradle, multiple connected devices whether to perform connection switching (Step S34); transmitting, by one of the connected devices, a switch command to the charging cradle (S341); and controlling, by the charging cradle, the earphone to form a new audio connection with one connected device transmitting the switch command (S342).

The difference between embodiments of FIG. 3 and FIG. 2 is that in FIG. 2, the second device 90 actively triggers a connection switching event, e.g., the second device 90 being operated, but in FIG. 3 the charging cradle 13 detects a connection switching event, e.g., noticing a previous audio connection over and having another external device connected thereto.

Step S31: The charging cradle 13 is coupled to the first device 70 via a first BT connection BT1, the charging cradle 13 is coupled to the second device 90 via a second BT connection BT2, and thus the charging cradle 13 records connection information (e.g., BT address) of the first device 70 and the second device 90 therein. The charging cradle 13 is further coupled to the earphone 11 via a third BT connection BT3. Meanwhile, the earphone 11 forms an audio connection Audio_1 with the first device 70, and records (previously paired) connection information (e.g., BT address) of the second device 90 therein.

Step S32: In the scenario that a user carries the wireless device with him/her and leaves the spot, the earphone 11 and the charging cradle 13 will leave a BT connection range of the first device 70. Therefore, when detecting interruption of the first BT connection BT1 with the first device 70 and/or interruption of the first audio connection Audio_1, the charging cradle 13 confirms a number of currently connected devices coupled thereto. As mentioned above, the charging cradle 13 records connection information of multiple external devices with which the BT connection is formed at the same time. The charging cradle 13 confirms whether the first audio connection Audio_1 is interrupted or not via the third BT connection BT3, e.g., the earphone 11 being arranged to send an interrupt signal Sitr when the first audio connection Audio_1 is terminated or released.

Step S33: When a number of external devices currently BT connected with the charging cradle 13 is equal to 1 (e.g., only connected with the second device 90), the charging cradle 13 sends a request signal Sreq to the second device 90 via the second BT connection BT2. After receiving the request signal Sreq, the second device 90 performs the Steps S22 and S23 mentioned above, and transmits a switch command Ssc to the charging cradle 13. Next, the charging cradle 13 controls, according to the switch command Ssc, the earphone 11 to build a new audio connection Audio_2 with the second device 90, details thereof referring to the Step S24. It is appreciated that if the first audio connection Audio_1 is already interrupted, the earphone 11 needs not to break the connection with the first device 70.

In another aspect, the charging cradle 13 directly transmits required information, e.g., BD-ADDR, for forming an audio connection between the earphone 11 and the second device 90 respectively to the earphone 11 and the second device 90 to directly perform the audio connection without inquiring the user whether to accept the connection switching via the second device 90. That is, the charging cradle 13 automatically controls the earphone 11 to audio connect with another BT connected (with the charging cradle 13) external device when a previously audio connected (with the earphone 11) is over.

Step S34: When a number of external devices currently BT connected to the charging cradle 13 is larger than 1, the charging cradle 13 transmits request commands Sreq to the multiple connected devices via respective BT connection to inquire whether the user agrees or accepts the connection switching, wherein the method of inquiring the user is not particularly limited.

Step S341: The user agrees or accepts connection switching on one of the multiple connected devices (e.g., referring to Step S22), and then the connected device currently operated by the user transmits a switch command Ssc via the associated BT connection, e.g., referring to Step S23. For example, the external device generating the switch command Ssc then enters a connection state.

Step S342: Finally, after receiving the switch command Ssc, the charging cradle 13 controls, e.g., by Scrc, the earphone 11 to form a new audio connection with the currently connected external device which transmits the switch command Ssc. When the first audio connection Audio_1 is interrupted, the charging cradle 13 controls the earphone 11 to build the new audio connection with the external device which transmits the switch command directly. For example, after the first audio connection Audio_1 is interrupted, the earphone 11 waits (e.g., in a connection state) the charging cradle 13 to transmit the device address or identification number (previously defined between the earphone and the charging cradle) of the external device that generates the switch command Ssc to the earphone 11 via the third BT connection BT3. However, when the first audio connection Audio_1 is not interrupted yet, the charging cradle 13 controls the earphone 11 to terminate the first audio connection Audio_1 at first and then to wait to build a new audio connection with the external device sending the switch command Ssc (e.g., referring to Step S24).

Figure 4:
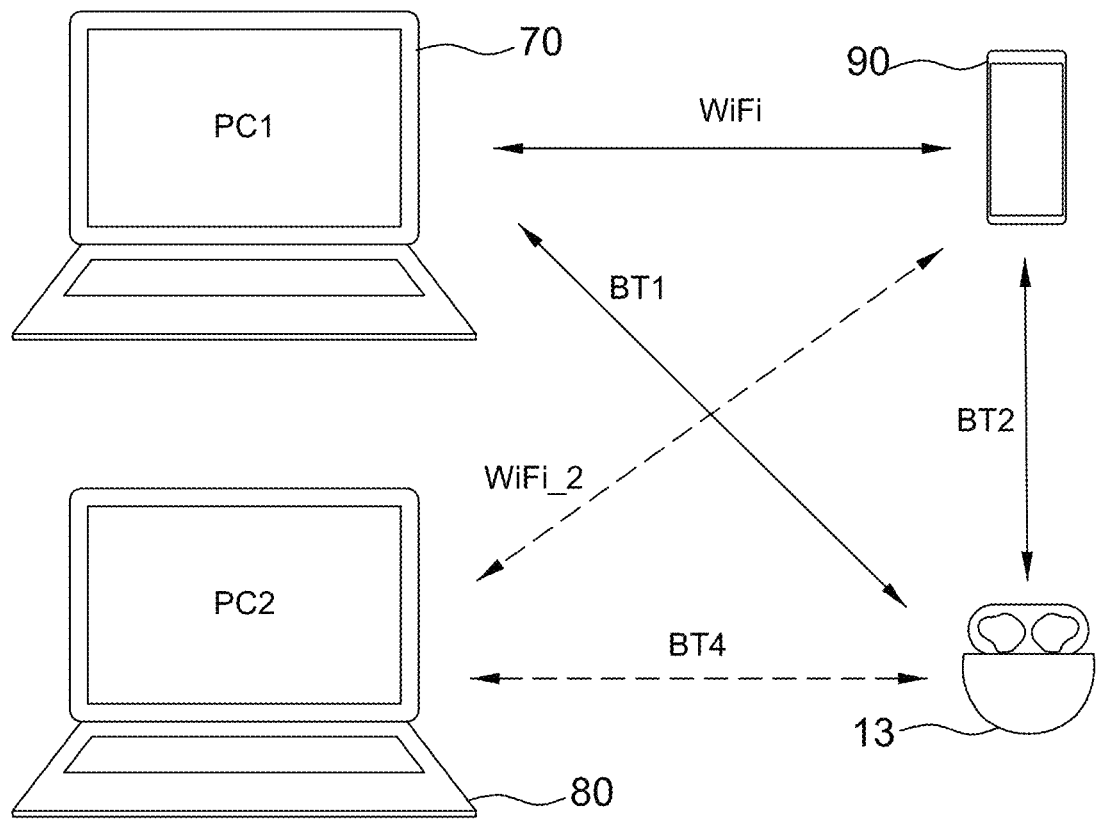
FIG. 4 is an operational schematic diagram of a wireless communication system according to a second embodiment of the present disclosure.
Figure 5:
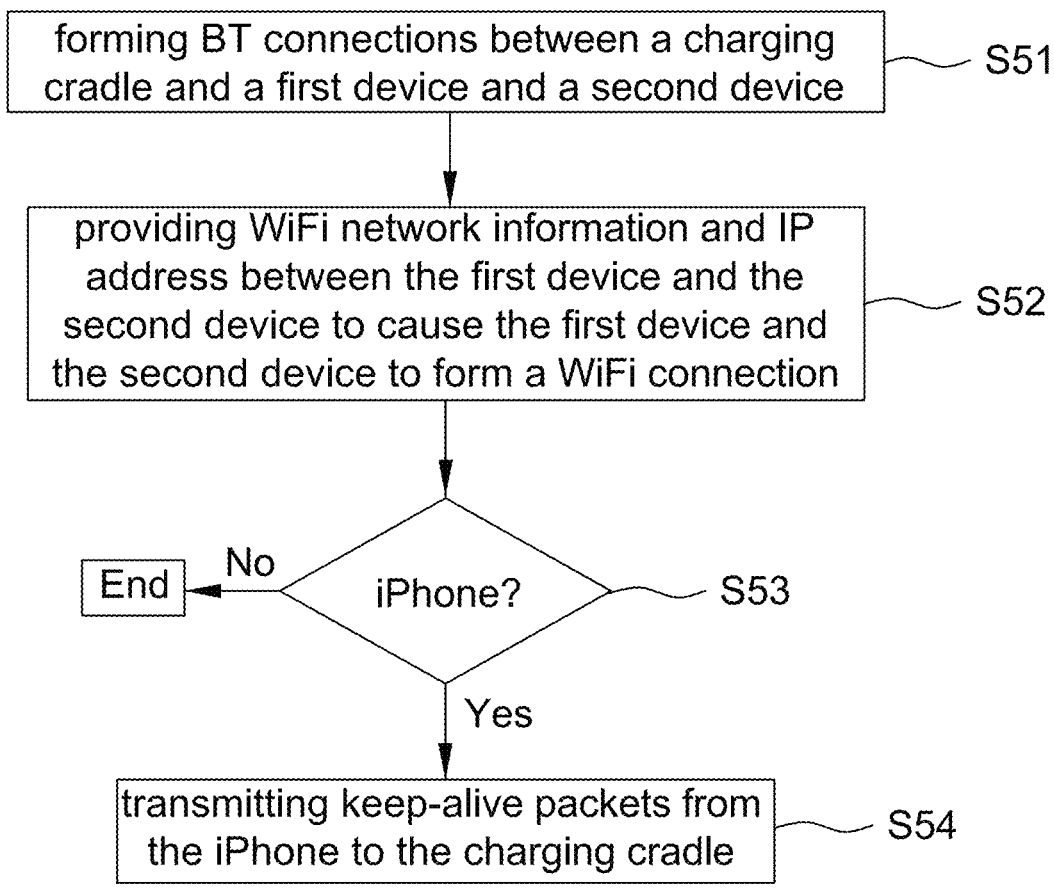
FIG. 5 is a flow chart of an operating method of a wireless communication system according to a second embodiment of the present disclosure.

Please refer to FIGS. 4 and 5, FIG. 4 is an operational schematic diagram of a wireless communication system according to a second embodiment of the present disclosure; and FIG. 5 is a flow chart of an operating method of a wireless communication system according to a second embodiment of the present disclosure. In FIG. 4, the wireless communication system is shown to include a charging cradle 13, a first device (shown as PC1) 70 and a second device 90. The first device 70 and the second device 90 have been BT paired with the charging cradle 13 previously.

In this embodiment, the operating method of the wireless communication system includes the steps of: forming BT connections between a charging cradle and a first device and a second device (Step S51); providing WiFi network information and IP address between the first device and the second device to cause the first device and the second device to form a WiFi connection (Step S52); confirming a specific system (shown as iPhone as an example) (Step S53); and if yes, transmitting keep-alive packets from the specific system to the charging cradle (Step S54).

The result of Step S53 is known (e.g., by confirming model of cellphone, but not limited to) when the program, algorithm or software (or APP) provided by the present disclosure is installed on the external device (e.g., cellphone), thus the position of Step S53 in the flow chart not limited to that shown in FIG. 5.

Step S51: The charging cradle 13 already forms a BT connection respectively with the first device 70 and the second device 90, shown as a first BT connection BT1 and a second BT connection BT2. In this case, the earphone 11 (not shown in FIG. 4) is accommodated in the charging cradle 13 for recharging or taken out from the charging cradle 13 without particular limitations.

Meanwhile, the first device 70 and the second device 90 are within an environment having a WiFi network. The device that provides the WiFi network is not particularly limited, e.g., an independent WiFi device or one of the first device 70 and the second device 90 used as a WiFi provider (e.g., hot spot).

Step S52: The charging cradle 13 further provides current WiFi network information and IP address of the first device 70 or the second device 90 via the first BT connection BT1 and the second BT connection BT2 to allow the first device 70 and the second device 90 to be able to form a WiFi connection. For example, in the case that the first device 70 has been connected to (or arranged to provide) the WiFi network, the charging cradle 13 provides the connected WiFi network information and a first IP address of the first device 70 and other required information to the second device 90 via the first BT connection BT1 and the second BT connection BT2. For example, in the case that the second device 90 has been connected to (or arranged to provide) the WiFi network, the charging cradle 13 provides the connected WiFi network information and a second IP address of the second device 90 and other required information to the first device 70 via the first BT connection BT1 and the second BT connection BT2. In this way, the first device 70 and the second device 90 automatically accomplish the WiFi connection therebetween.

Accordingly, in an environment with several WiFi networks, the first device 70 and the second device 90 are connected to the same WiFi network through the charging cradle 13. In another aspect, the first device 70 and the second device 90 is connected using WiFi direct according to the information provided by the charging cradle 13.

The purpose of the WiFi connection is to provide data transmission between the first device 70 and the second device 90. In the aspect that the first device 70 is a computer and the second device 90 is a cellphone, the WiFi connection performs at least one of transmitting files (e.g., data backup), projecting a screen of the cellphone to the computer and controlling the cellphone by the computer, e.g., simulating the computer as a BT keyboard/mouse of the cellphone to control the cellphone using the BT keyboard/mouse. It is appreciated that when the first device 70 and the second device 90 are formed by the combination of different electronic devices, data transmitted by the WiFi connection is different. In the present disclosure, by installing predetermined program, algorithm, or software respectively on the first device 70 and the second device 90, the Steps S51 and S52 are executed thereby.

In addition, in some cellphones, such as iPhones, the predetermined program, algorithm, or software is compelled to deactivate after the predetermined program, algorithm, or software enters background (e.g., turning off screen, switching screen) for a predetermined time interval. In order not to interrupt the data transmission, the wireless communication system of the present disclosure further confirms whether the first device 70 and the second device 90 are operated in a specific system, such as iOS (Step S53).

Step S54: If one of the first device 70 and the second device 90 is operated in said specific system, the charging cradle 13 further receives keep-alive packets from said specific system after the predetermined program, algorithm, or software enters background so as to prevent the predetermined program, algorithm, or software from being ceased so as to maintain the BT connection between the external device operated in said specific system and the charging cradle 13, e.g., BT2. Accordingly, as long as the BT connect between the external device operated in said specific system and the charging cradle 13 is survived, unless being manually turned off by a user, the WiFi connection between the first device 70 and the second device 90 is continuously existing such that the file transmission is not interrupted in the middle of transmission. The WiFi connection between the first device 70 and the second device 90 is broken only when the BT connection between the charging cradle 13 and the external device operated in said specific system is lost.

FIG. 4 shows that the wireless communication system further includes a third device (shown as PC2) 80, which has also been BT paired with the charging cradle 13. When the user carries the second device 90 and the charging cradle 13 to leave a BT connection range of the first device 70 and then to enter a BT connection range of the third device 80, e.g., leaving the office and going back home, the charging cradle 13 automatically forms a BT connection with the third device 80, e.g., BT4. In this case, the wireless communication system builds a WiFi connection WiFi_2 between the second device 90 and the third device 80 using the method of the Step S52, and also performs the Steps S53 and S54, details thereof not being repeated again.

In the second embodiment, if a user is supposed to stay at different activity locations, by using the charging cradle 13 as a medium, the second device 90 (e.g., carried electronic device) automatically forms a WiFi connection with different electronic equipment according to FIG. 5.

Figure 6:
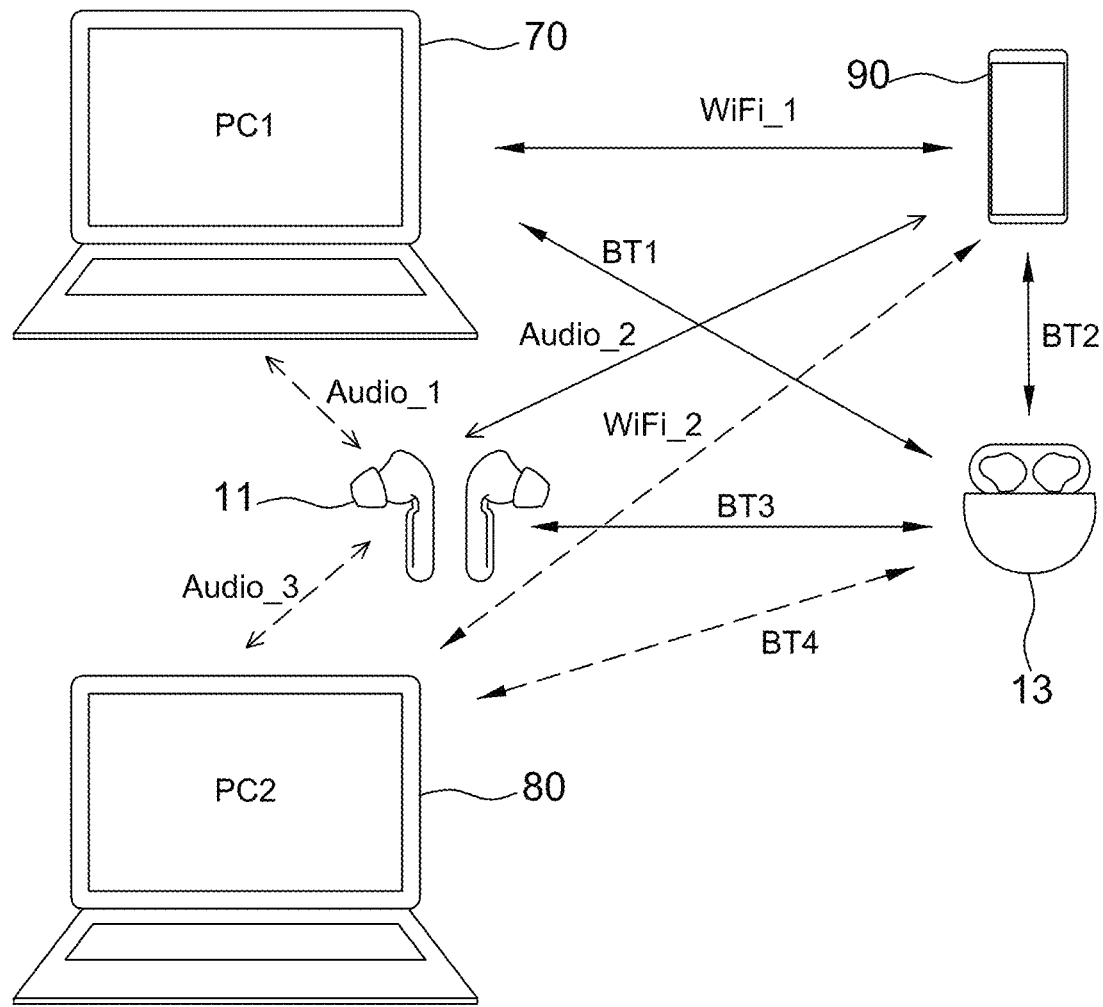
FIG. 6 is an operational schematic diagram of a wireless communication system according to a third embodiment of the present disclosure.
Figure 7:
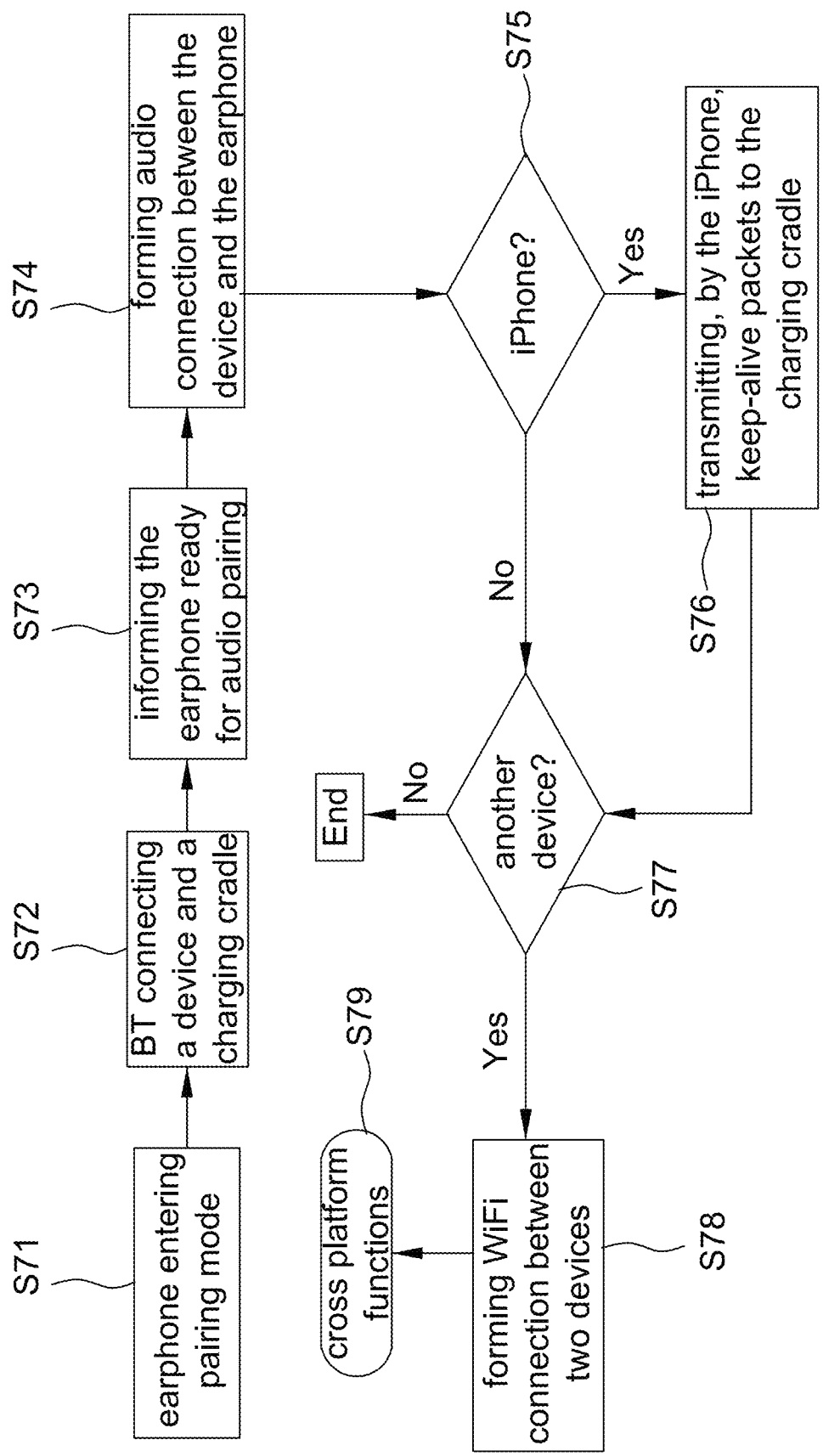
FIG. 7 is a flow chart of an operating method of a wireless communication system according to a third embodiment of the present disclosure.

Please refer to FIGS. 6 and 7, FIG. 6 is an operational schematic diagram of a wireless communication system according to a third embodiment of the present disclosure; and FIG. 7 is a flow chart of an operating method of a wireless communication system according to a third embodiment of the present disclosure. In FIG. 6, the wireless communication system is shown to include an earphone 11, a charging cradle 13, a first device 70 and a second device 90. The first device 70, the second device 90 and the earphone 11 have been BT paired with the charging cradle 13 previously.

The operating method of the wireless communication system of the third embodiment includes the steps of: using an earphone to enter a connection state (Step S71); BT connecting a device and a charging cradle (Step S72); informing, by the charging cradle, the earphone to be ready for audio connecting (Step 73); forming an audio connection between the device and the earphone (Step S74); confirming a specific system (shown as iPhone as an example) (Step S75); if yes, transmitting, by the specific system, keep-alive packets to the charging cradle (Step S76); if not, entering Step S77 to detect another device; if yes, forming a WiFi connection between two devices (Step S78); and performing cross platform functions (Step S79).

In one aspect, the Step S76 is performed after the associated program, algorithm or software installed in an external device enters background. In one aspect, the result of the Step S75 is known when the external device (e.g., second device 90) finishes the installation of the associated program, algorithm or software provided by the present disclosure, i.e. the location of Step S75 in the flow chart is not limited to that shown in FIG. 7. For example, if the installed program, algorithm or software already knows whether the external device is an iPhone or not, the Step S75 in FIG. 7 is replaced by confirming whether the installed program, algorithm or software is in background or not.

Step S71: While being taken out from the charging cradle 13, the earphone 11 automatically enters a connection state.

Steps S72-S73: In an aspect that the second device 90 is a cellphone, the charging cradle 13 generally forms a BT connection with the second device 90 for a long time, e.g., BT2. After the charging cradle 13 is BT connected with the second device 90, the charging cradle 13 informs the earphone 11 to be ready for the audio connecting, e.g., providing the device address BD_ADDR of the second device 90 to the earphone 11. In one aspect, the earphone 11 is arranged not to audio connect to any device not BT connected with the charging cradle 13.

Step S74: As mentioned above, the earphone 11 forms an audio connection only with an external device that currently forms a BT connection with the charging cradle 13. After receiving the device address (or identification number) of the second device 90 from the charging cradle 13, the earphone 11 builds an audio connection with the second device 90.

Steps S75-S76: As mentioned above, in order not to allow the operation of this embodiment to be terminated in background, the program, algorithm, or software associated with the present disclosure confirms whether the second device 90 is an iPhone or not. If yes, the program, algorithm, or software controls the iPhone to continuously transmit keep-alive packets to keep the BT connection BT2 alive.

Step S77-S78: Next, the charging cradle 13 detects whether there is another device (e.g., first device 70) in the BT connection range thereof. If there is indeed the first device 70 being searched, the charging cradle 13 forms a BT connection with the first device 70, e.g., BT1. Next, a WiFi connection, e.g., WiFi_1 between the first device 70 and the second device 90, is formed using the Step S52 in FIG. 5.

Step S79: After the WiFi connection between the first device 70 and the second device 90 is built up, the installed program, algorithm or software performs cross platform functions, including transmitting files, projecting a screen of the cellphone to the computer and controlling the cellphone by the computer via the WiFi connection as mentioned above. It is appreciated that said cross platform functions may include other functions depending on different applications.

Besides, the wireless communication system in FIG. 6 further performs the function of switching the audio connection of the earphone 11 to the first device 70, i.e. from Audio_2 to Audio_1, as shown in FIGS. 2 and 3.

FIG. 6 shows that the wireless communication system further includes a third device 80, which has also been BT paired with the charging cradle 13 and the earphone 11. When a user carries the second device 90 and the wireless device to leave a BT connection range of the first device 70 and then to enter a BT connection range of the third device 80, e.g., leaving the office and going back home, the charging cradle 13 automatically forms a BT connection with the third device 80, e.g., BT4, similar to Step S77. In this case, the wireless communication system builds a WiFi connection WiFi_2 between the second device 90 and the third device 80 using the method similar to Step S52 and Step S78. Similarly, when the BT connection of the charging cradle 13 is switched from BT1 to BT4, the wireless communication system further performs the audio connection switching of the earphone 11 to the third device 80 as shown in FIG. 6, i.e. from Audio_1 to Audio_3, details thereof not repeated again.

Briefly speaking, the first embodiment is to use the charging cradle 13 to help the earphone 11 switching the audio connection between external devices; the second embodiment is to use the charging cradle 13 to help the WiFi connection between different external devices; and the third embodiment is a combination of the first embodiment and the second embodiment.

In the present disclosure, each of the multiple external devices is installed with a predetermined program, algorithm or software to perform the above mentioned inquiring, BT connection, WiFi connection, audio connection and connection switching shown in FIGS. 2-3, 5 and 7. When said program, algorithm or software enters background of the external device, said program, algorithm or software continuously outputs keep-alive packets to prevent the program, algorithm or software from being cut off. The keep-alive packets are implemented by, for example, write without response payload, but not limited to.

It should be mentioned that although in FIG. 2 the inquiring is performed by a device not currently being audio connected with the earphone 11, the present disclosure is not limited thereto. In another aspect, the user inquiry is performed by a device currently audio connected to the earphone 11. That is, the audio connected device outputs a switch command to the charging cradle 13, and then the charging cradle 13 informs the earphone 11 to accomplish the dis-connection and new-connection. After understanding the operating method in FIG. 2, one of ordinary skill in the art would also understand the connection switching triggered by the audio connected device, and thus details are not repeated herein.

It should be mentioned that although the keep-alive packets are sent by the iPhone as an example mentioned above, the present disclosure is not limited thereto. In another aspect, as long as an external device (including cellphones other than iPhone or electronic devices) is arranged to close the background program, algorithm and software, the program, algorithm or software provided by the present disclosure is arranged to output keep-alive packets at a predetermined frequency to keep the BT connection and WiFi connection alive.

In the present disclosure, in addition to the audio connection, the earphone 11 further transmits other data to and from the multiple external devices according to the BT protocol.

In FIGS. 1, 4 and 6, devices at two ends of a solid line indicate that the connection therebetween has been formed, and devices at two ends of a dashed line indicate that the pairing therebetween has been accomplished but the connection therebetween is not formed yet.

As mentioned above, conventional BT earphones not only can easily be interfered by sounds from different devices in connection but also need to manually switch a connected device to have a poor user experience.

Accordingly, the present disclosure further provides a wireless device (e.g., FIGS. 1, 4 and 6) and a wireless communication system including the same and an operating method of the wireless communication system (e.g., FIGS. 2-3, 5 and 7) that mainly use a charging cradle as a medium to accomplish functions of switching between connected devices and communicating between different platforms so as to improve the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A wireless device, comprising:
    a charging cradle, configured to record connection information of multiple external devices which respectively form a Bluetooth (BT) connection with the charging cradle, and to transmit a connection request command; and
    an earphone, configured to be accommodated in the charging cradle for charging, and determine an audio play target according to the connection request command from the charging cradle so as to form an audio connection with one of the multiple external devices, wherein
    when the charging cradle is BT connected with a first device and a second device, and the earphone forms a first audio connection with the first device,
    the charging cradle is further configured to receive a switch command from the second device to control the earphone to disconnect the first audio connection with the first device and form a second audio connection with the second device.

2. A wireless device, comprising:
    a charging cradle, configured to record connection information of multiple external devices which respectively form a Bluetooth (BT) connection with the charging cradle, and to transmit a connection request command; and
    an earphone, configured to be accommodated in the charging cradle for charging, and determine an audio play target according to the connection request command from the charging cradle so as to form an audio connection with one of the multiple external devices, wherein
    when the charging cradle is BT connected with a first device and a second device,
    the charging cradle is further configured to provide current WiFi network information and an IP address of the first device or the second device via the BT connection to cause the first device and the second device to form a WiFi connection.

3. The wireless device as claimed in claim 2, wherein when one of the first device and the second device is an iPhone, the charging cradle is further configured to receive keep-alive packets from the iPhone to keep the BT connection between the iPhone and the charging cradle alive.

4. The wireless device as claimed in claim 1, wherein the charging cradle is further configured to transmit a request signal to the second device to generate the switch command while detecting the BT connection with the first device is interrupted.

5. The wireless device as claimed in claim 1, wherein the charging cradle is further configured to transmit a request signal to the second device to generate the switch command while detecting the first audio connection is interrupted.

6. A wireless device, comprising:
    a charging cradle, configured to record connection information of multiple external devices which respectively form a Bluetooth (BT) connection with the charging cradle, and to transmit a connection request command; and
    an earphone, configured to be accommodated in the charging cradle for charging, and determine an audio play target according to the connection request command from the charging cradle so as to form an audio connection with one of the multiple external devices, wherein
    the charging cradle and the earphone form another BT connection therebetween to transmit the connection request command.

7. The wireless device as claimed in claim 2, wherein one of the first device and the second device is an iPhone, and the charging cradle is further configured to receive keep-alive packets from the iPhone, and
    when the Bluetooth (BT) connection between the iPhone and the charging cradle is interrupted, the WiFi connection between the first device and the second device is interrupted.

8. The wireless device as claimed in claim 2, wherein the first device is a computer and the second device is a cellphone, and
    the first device and the second device are configured to perform at least one of transmitting files, projecting a screen of the cellphone to the computer and controlling the cellphone by the computer via the WiFi connection.

* * * * *